Dec. 3, 1963 R. C. BYLOFF 3,113,247
POWER FAILURE SENSOR
Filed July 5, 1960
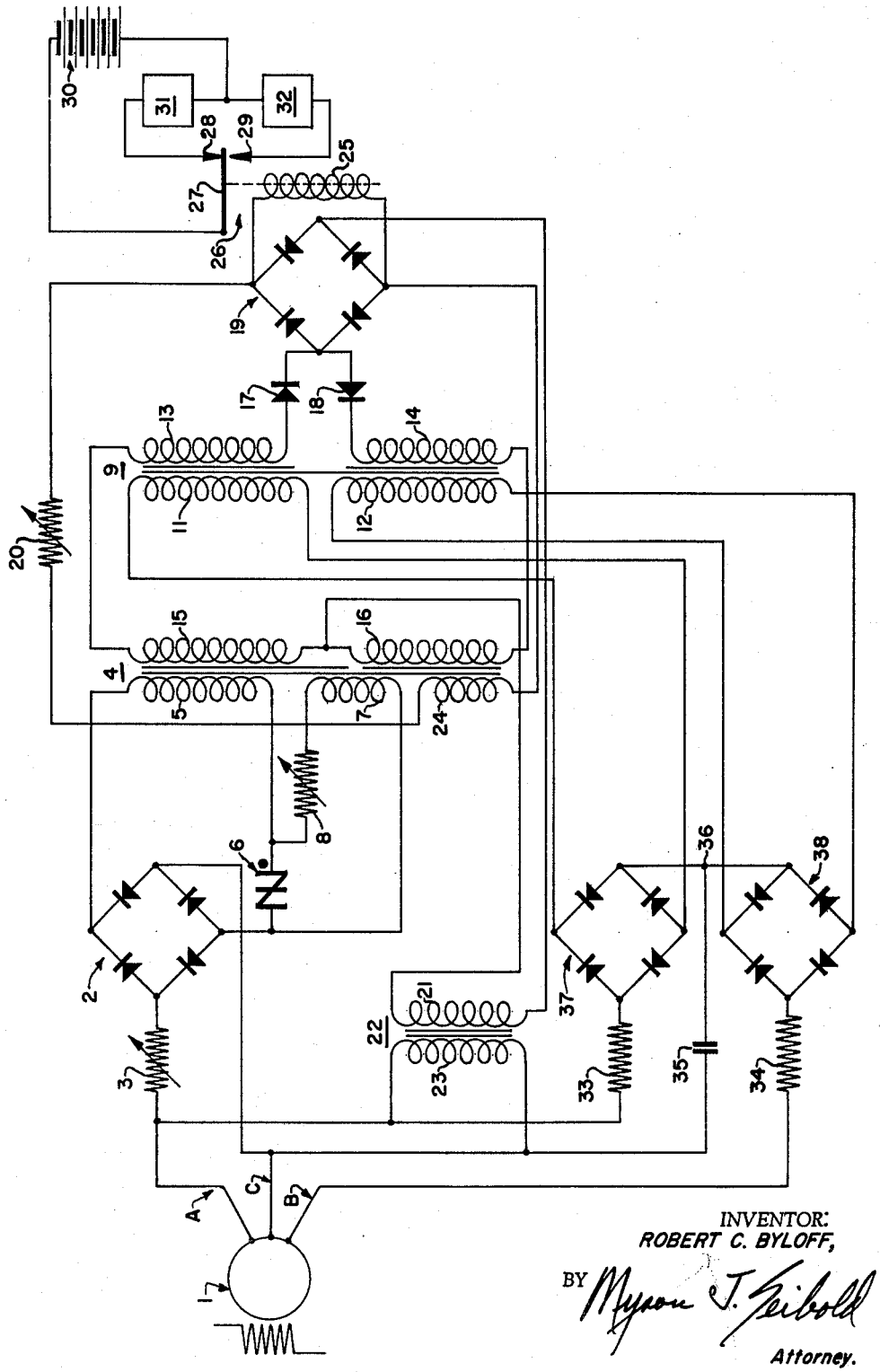
INVENTOR:
ROBERT C. BYLOFF,
BY *Myron J. Seibold*
Attorney.

United States Patent Office 3,113,247
Patented Dec. 3, 1963

3,113,247
POWER FAILURE SENSOR
Robert C. Byloff, Los Angeles, Calif., assignor to The Garrett Corporation, Los Angeles, Calif., a corporation of California
Filed July 5, 1960, Ser. No. 40,930
15 Claims. (Cl. 317—48)

This invention relates to a power failure sensor for an electrical system and more particularly to a circuit for sensing power failure in a three-phase electrical system and for initiating a control function when various circuit parameters deviate more than a specified amount from their nominal values. Specifically, the power failure sensor includes circuits responsive to low line voltage, shorted and open lines, and phase sequence reversal.

An object of the invention is a new and improved power failure sensor for a multi-phase electrical system employing detecting circuits for under-voltage and phase sequence reversal.

Another object of the invention is a power failure sensor for a multi-phase electrical system employing a pair of magnetic amplifiers having their gate windings controlling a power failure interpretation circuit, the conduction of one of the magnetic amplifiers being controlled by the voltage level of the supply and the conduction of the other magnetic amplifier being controlled by the phase sequence of the supply.

Another object of the invention is a power failure sensor for a multi-phase electrical system employing a pair of magnetic amplifiers having their gate windings connected in series to feed a power failure interpretation circuit, one of said magnetic amplifiers being rendered nonconducting when the supply voltage declines to a predetermined level and the other of said magnetic amplifiers being rendered non-conducting upon reversal of the phase sequence of the supply.

Another object of the invention is a new and improved low voltage detection circuit for an electrical system.

Another object of the invention is a new and improved phase sequence reversal detection circuit for a multi-phase electrical system.

Other objects and features of the invention will be readily apparent to those skilled in the art from this specification and the appended drawing illustrating a certain preferred embodiment in which:

The FIGURE is a schematic wiring diagram of a power failure sensor for a three-phase supply.

In the drawing the supply is indicated by an alternator 1 having a three-phase output A, C, B. A rectifier bridge 2 is connected across phases A and C through an adjustable, voltage dropping resistor 3. A first magnetic amplifier is shown at 4 having a control winding 5 connected across the output of the rectifier bridge 2 through a Zener diode 6 and a bias winding 7 connected across the Zener diode 6 through an adjustable resistor 8 which determines the level of the fixed bias applied to the magnetic amplifier 4 by the substantially constant voltage across the Zener diode 6.

A second magnetic amplifier is indicated at 9 and is provided with a pair of control windings 11 and 12, and with a pair of gate windings 13 and 14. The magnetic amplifier 4 has gate windings 15 and 16 which are connected in series with the gate windings 13 and 14 and with rectifiers 17 and 18 providing for self-saturating operation of the magnetic amplifiers. A load rectifier bridge 19 is fed through the gate windings 13, 14, 15 and 16 and rectifiers 17 and 18 by the secondary 21 of a transformer 22 whose primary 23 is connected across phases A and C of the supply. The magnetic amplifier 4 is provided with a feedback winding 24 which is fed from the output of the load rectifier bridge 19 through an adjustable resistor 20 to provide positive feedback to the magnetic amplifier 4 for bistable operation thereof.

The output of the load rectifier bridge 19 is also fed to the operating coil 25 of a relay 26 which has a movable contact 27 cooperating with stationary contacts 28 and 29 to control circuits through warning, indicating or controlling devices 31 and 32 energized from a battery supply 30. In their simplest form, the devices 31 and 32 could be simple warning lights with the device 31 a green light to indicate conduction in both magnetic amplifiers 4 and 9 and with the device 32 a red light illuminated when either of the magnetic amplifiers 4 and 9 becomes nonconducting to de-energize the relay operating coil 25 in response to either a low voltage or phase sequence reversal condition.

The phase sequence reversal detection circuit consists of two resistors 33 and 34, preferably of equal value and each connected in one leg of a Y, the third leg of the Y consisting of a capacitor 35, the common point of the Y being indicated at 36. In series with the resistor 33 in the leg of the Y connected to phase A is a rectifier bridge 37; in series with the resistor 34 in the leg of the Y connected to phase B is a rectifier bridge 38. The capacitor 35 is connected to phase C. The output of the rectifier bridge 37 is fed to the control winding 11 of the magnetic amplifier 9 and the output of the rectifier bridge 38 is fed to the control winding 12 of the magnetic amplifier 9.

The characteristics of this Y-connected network are such that the voltages existing across resistors 33 and 34, even though identical in resistance value, will be different from each other by a ratio of nearly 4 to 1 when the optimum value of the capacitor 35 is used. Upon phase sequence reversal the relative magnitudes of the two voltages across resistors 33 and 34 will reverse. The control windings of the magnetic amplifier 9 are arranged so that the core thereof is saturated under conditions of proper phase sequence such as a desired phase sequence A, C, B in which the output of the rectifier bridge 37 is considerably greater than the output of the rectifier bridge 38. Should the phase sequence reverse to A, B, C, the output of rectifier bridge 38 swings greater than the output of bridge 37 and the core of magnetic amplifier 9 becomes unsaturated to render its gate windings 13 and 14 nonconducting.

Various line fault conditions occurring in the supply may cause equal voltages to exist across the resistors 33 and 34 which again will render the cores of magnetic amplifier 9 unsaturated to cut off current flow through its gate windings.

In the operation of the power failure sensor of the invention, the windings 5, 7 and 24 of the magnetic amplifier 4 are energized in the following manner: The winding 24 is energized for positive feedback from the load rectifier bridge 19 so that it tends to saturate the cores of magnetic amplifier 4 to render its gate windings 15 and 16 conducting. Control winding 5 is energized from the rectifier bridge 2 connected across phases A and C so that its magnetomotive force is in the same direction as the magnetomotive force produced by the feedback winding 24 so that the effects are additive. The control winding 5 is fed through Zener diode 6 in the direction opposite to its normal direction of conduction, this being effected by the voltage applied from the rectifier bridge 2 being greater than the breakdown or avalanche voltage of the Zener diode. Under this reverse conduction condition the voltage across the Zener diode is substantially constant and this voltage is utilized to feed the bias winding 7 through the adjustable resistor 8, with the direction of energization producing a magnetomotive force opposing the combined magnetomotive forces produced by the windings 5 and 24.

The resistors 3, 8 and 20 are so adjusted that the magnetomotive forces of the control winding 5 and feedback winding 24 overcome the magnetomotive force of bias winding 7 under normal voltage conditions, while under conditions of voltage lower than a predetermined value set by the resistor adjustments, the magnetomotive force of bias winding 7 will prevail to unsaturate the cores of magnetic amplifier 4 and render its gate windings 15 and 16 nonconducting. When the supply voltage decreases below this predetermined value, the magnetomotive force produced by control winding 5 decreases to such value that the magnetomotive force of bias winding 7 overcomes the combined magnetomotive forces of the control and feedback windings 5 and 24 to unsaturate the cores of the magnetic amplifier 4 and render its gate windings 15 and 16 nonconducting. The supply to the load rectifier bridge 19 is thus cut off and the operating winding 25 of relay 26 is de-energized so that movable contact 27 opens the circuit through contact 28 to de-energize the device 31 and closes the circuit through contact 29 to energize the device 32 to give an interpretation or warning, or initiate a control function as a result of the low voltage condition of the supply.

As has been explained heretofore, the characteristics of the phase sequence detection circuit, in which the two resistors 33 and 34 and capacitor 35 are connected in Y across the three-phase supply, are such that the relative magnitude of the voltages across the resistors 33 and 34 changes upon phase sequence reversal. Thus, with phase sequence A, C, B and with equal value of resistance for the resistors 33 and 34 and the proper value of the capacitor 35, the voltage across the resistor 33 will be greater than the voltage across the resistor 34. With proper polarization of the outputs of bridges 37 and 38 relative to the control windings 11 and 12, the cores of the magnetic amplifier 9 will, at this time, be saturated to render its gate windings 13 and 14 conducting and, if the gate windings 15 and 16 of magnetic amplifier 4 are also conducting, the operating coil 25 of relay 26 will be energized. Upon a phase sequence reversal to A, B, C, the relative magnitude of the voltages across the resistors 33 and 34 reverses so that the voltage across the resistor 34 is now greater to effect unsaturation of the cores of the magnetic amplifier 9 and render its gate windings 13 and 14 nonconducting, thus de-energizing the operating coil 25 and energizing the power failure interpretation device 32.

While a certain preferred embodiment of the invention has been specifically disclosed in accordance with the patent statutes, it will be understood that the invention is not limited thereto as many variations will be readily apparent to those skilled in the art and the invention is to be given its broadest possible interpretation consistent with the prior art.

I claim:

1. In a power failure sensor for detecting low voltage and phase sequence reversal in a multi-phase electrical supply, first and second magnetic amplifiers, gate windings on said magnetic amplifiers, a load circuit giving a power failure interpretation, means energizing said load circuit through said gate windings and rectifiers connected in series therewith providing self-saturating operation of the magnetic amplifiers, means applying a magnetomotive force to the cores of said first magnetic amplifier which is a function of the voltage of the supply to control the conductivity of the gate windings of said first magnetic amplifier in accordance with the value of the supply voltage, and means applying a magnetomotive force to the cores of said second magnetic amplifier which is a function of the phase sequence of the supply so that the gate windings of said second magnetic amplifier are conducting only when the supply has a predetermined phase sequence.

2. In a power failure sensor for detecting low voltage and phase sequence reversal in a multi-phase electrical supply, first and second magnetic amplifiers, gate windings on said magnetic amplifiers, a load circuit giving a power failure interpretation, means energizing said load circuit through said gate windings and rectifiers connected in series therewith providing self-saturating operation of the magnetic amplifiers, means applying a magnetomotive force to the cores of said first magnetic amplifier which is a function of the voltage of the supply so as to render the gate windings of said first magnetic amplifier conducting only when the supply voltage is above a predetermined value, and means applying a magnetomotive force to the cores of said second magnetic amplifier which is a function of the phase sequence of the supply so that the gate windings of said second magnetic amplifier are conducting only when the supply has a predetermined phase sequence.

3. In a power failure sensor for detecting low voltage and phase sequence reversal in a multi-phase electrical supply, first and second magnetic amplifiers, a load circuit giving a power circuit interpretation, gate windings on said magnetic amplifiers, means energizing said load circuit through said gate windings, at least two control windings on said first magnetic amplifier, means energizing one of said control windings with a voltage which is a function of the voltage of said supply to apply a first magnetomotive force to the cores of said first magnetic amplifier to control the conduction of its gate windings, means energizing a second control winding for said first magnetic amplifier to apply a second magnetomotive force to the cores of said first magnetic amplifier opposite to the first magnetomotive force, the level of energization of said control windings being such that said cores are unsaturated when the supply voltage is lower than a predetermined value to render the gate windings of said first magnetic amplifier nonconducting, a pair of control windings on said second magnetic amplifier, means energizing said pair of control windings to produce magnetomotive forces one of which tends to saturate and the other to unsaturate the cores of said second magnetic amplifier, said last mentioned means including a phase sequence detecting circuit energizing said pair of control windings for said second magnetic amplifier with voltages which reverse in relative magnitude upon reversal in phase sequence of the supply.

4. In a power failure sensor for detecting low voltage and phase sequence reversal in a multi-phase electrical supply, first and second magnetic amplifiers, gate windings on said magnetic amplifiers, a load circuit giving a power failure interpretation, means energizing said load circuit through said gate windings and rectifiers connected in series therewith providing self-saturating operation of the magnetic amplifiers, at least two control windings on said first magnetic amplifier, means energizing one of said control windings with a voltage which is a function of the voltage of said supply to apply a magnetomotive force to the cores of said first magnetic amplifier, means energizing a second control winding on said first magnetic amplifier from the output of said gate windings to apply a positive feedback to said first magnetic amplifier to provide for bistable operation thereof, a pair of control windings on said second magnetic amplifier, means energizing said pair of control windings to produce opposed magnetomotive forces one of which tends to saturate and the other to unsaturate the cores of said second magnetic amplifier, said last mentioned means including a phase sequence detecting circuit energizing said pair of control windings for said second magnetic amplifier with voltages which reverse in relative magnitude upon reversal in phase sequence of the supply.

5. In a power failure sensor for detecting low voltage and phase sequence reversal in a multi-phase electrical supply, first and second magnetic amplifiers, gate windings on said magnetic amplifiers, a load circuit giving a power failure interpretation, means energizing said load circuit through said gate windings and rectifiers connected in series therewith providing self-saturating operation of the magnetic amplifiers, at least two control windings on said first magnetic amplifier, means energizing one of said control windings with a voltage which is a function of the voltage of said supply to apply a magnetomotive force to the cores of said first magnetic amplifier, means energizing a second control winding on said first magnetic amplifier from a substantially constant voltage source to apply a magnetomotive force to the cores on said first magnetic amplifier opposing said first mentioned magnetomotive force, a pair of control windings on said second magnetic amplifier, means energizing said pair of control windings to produce opposed magnetomotive forces one of which tends to saturate and the other to unsaturate the cores of said second magnetic amplifier, said last mentioned means including a phase sequence detecting circuit energizing said pair of control windings for said second magnetic amplifier with voltages which reverse in relative magnitude upon reversal in phase sequence of the supply.

6. In a power failure sensor for detecting low voltage and phase sequence reversal in a multi-phase electrical supply, first and second magnetic amplifiers, gate windings on said magnetic amplifiers, a load circuit giving a power failure interpretation, means energizing said load circuit through said gate windings and rectifiers connected in series therewith providing self-saturating operation of the magnetic amplifiers, at least three control windings on said first magnetic amplifier, means energizing one of said control windings from the output of said gate windings to apply a first magnetomotive force to the cores of said first magnetic amplifier in a direction to provide a positive feedback giving bistable operation thereof, means energizing a second control winding on said first magnetic amplifier from a substantially constant voltage source to apply a second magnetomotive force to the cores of said first magnetic amplifier in opposition to said first magnetomotive force, means energizing a third control winding on said first magnetic amplifier with a voltage which is a function of the voltage of said supply to apply a third magnetomotive force to the cores of said first magnetic amplifier in the same direction as said first magnetomotive force, the level of energization of said control windings being such that the cores of said first magnetic amplifier are unsaturated when the supply voltage is lower than a predetermined value to render the gate winding of said first magnetic amplifier nonconductive, a pair of control windings on said second magnetic amplifier, means energizing said pair of control windings to produce opposed magnetomotive forces one of which tends to saturate and the other to unsaturate the cores of said second magnetic amplifier, said last mentioned means including a phase sequence detecting circuit energizing said pair of control windings for said second magnetic amplifier with voltages which reverse in relative magnitude upon reversal in phase sequence of the supply.

7. In a power failure sensor for detecting low voltage and phase sequence reversal in a multi-phase electrical supply, first and second magnetic amplifiers, a load circuit giving a power failure interpretation, gate windings on said magnetic amplifiers, means energizing said load circuit through said gate windings, at least two control windings on said first magnetic amplifier, means energizing one of said control windings to supply a magnetomotive force in a direction to saturate the cores of said first magnetic amplifier to render its gate windings conducting, said last mentioned means energizing said one control winding with a voltage which is a function of the voltage of said supply, means energizing a second control winding for said first magnetic amplifier to supply a magnetomotive force opposing said first magnetomotive force and tending to unsaturate the cores of said first magnetic amplifier, the level of energization of said control windings being such that said cores are unsaturated when the supply voltage is lower than a predetermined value, a pair of control windings on said second magnetic amplifier, means energizing said pair of control windings to produce opposed magnetomotive forces one of which tends to saturate and the other to unsaturate the cores of said second magnetic amplifier, said last mentioned means including a phase sequence detecting circuit energizing said pair of control windings for said second magnetic amplifier with voltages which reverse in relative magnitude upon reversal in phase sequence of the supply.

8. In a power failure sensor for detecting low voltage and phase sequence reversal in a multi-phase electrical supply, first and second magnetic amplifiers, a load circuit giving a power failure interpretation, gate winding on said magnetic amplifiers, means energizing said load circuit through said gate windings and rectifiers connected in series therewith providing self-saturating operation of the magnetic amplifiers, at least two control windings on said first magnetic amplifier, means energizing one of said control windings to supply a magnetomotive force in a direction to saturate the cores of said first magnetic amplifier to render its gate windings conducting, said last mentioned means energizing said control windings with a voltage which is a function of the voltage of said supply, means energizing a second control winding for said first magnetic amplifier to supply a magnetomotive force opposing said first magnetomotive force and tending to unsaturate the cores of said first magnetic amplifier, the level of energization of said control windings being such that said cores are unsaturated when the supply voltage is lower than a predetermined value, a pair of control windings on said second magnetic amplifier, means energizing said pair of control windings to produce opposed magnetomotive forces one of which tends to saturate and the other to unsaturate the cores of said second magnetic amplifier said last means including a phase sequence detecting circuit energizing said pair of control windings for said second amplifier with voltages which reverse in relative magnitude upon reversal in phase sequence of the supply.

9. In a power failure sensor for detecting low voltage and phase sequence reversal in a multi-phase electrical supply, first and second magnetic amplifiers, a load circuit giving a power failure interpretation, gate windings on said magnetic amplifiers, means energizing said load circuit through said gate windings, at least three control windings on said first magnetic amplifier, means energizing one of said control windings from the output of said gate windings to provide a positive feedback supplying a magnetomotive force in a direction to saturate the cores of said first magnetic amplifier to render its gate windings conducting, means energizing a second control winding on said first magnetic amplifier with a voltage which is a function of the voltage of said supply to apply a magnetomotive force in the same direction as said first magnetomotive force, means energizing a third control winding on said first magnetic amplifier from a substantially constant voltage source to supply a magnetomotive force opposing said first and second magnetomotive forces and tending to unsaturate the cores of the first magnetic amplifier, the level of energization of said control windings being such that said cores are unsaturated when the supply voltage is lower than a predetermined value, a pair of control windings on said second magnetic amplifier, means energizing said pair of control windings to produce magnetomotive forces one of which tends to saturate and the other to unsaturate the cores of said second magnetic amplifier, said last mentioned means including a phase sequence detecting circuit energizing said pair of control windings for said second magnetic amplifier with voltages which reverse in relative magnitude upon reversal in phase sequence of the supply.

10. In a power failure sensor for detecting low voltage and phase sequence reversal in a three-phase supply, first and second magnetic amplifiers, gate windings on said magnetic amplifiers connected in series, a load circuit giving a power failure interpretation, means energizing said load circuit through said gate windings, a bias winding on said first magnetic amplifier, a substantially constant voltage source energizing said bias winding, a control winding on said first magnetic amplifier, means energizing said control winding with a voltage which is a function of the voltage of said supply, the magnetomotive forces induced by said bias and control windings being in opposition, with the control winding producing saturation of the cores on said first magnetic amplifier to render its gate windings conducting only while the source voltage is above a predetermined value, a pair of control windings on said second magnetic amplifier, and a phase sequence detecting circuit feeding said pair of control windings with voltages producing opposed magnetomotive forces one of which tends to saturate and the other to unsaturate the cores of said second magnetic amplifier, said phase sequence detecting circuit operating to reverse the relative magnitude of the voltages applied to the control windings on said second magnetic amplifier when the phase sequence of the supply reverses.

11. In a power failure sensor for detecting low voltage and phase sequence reversal in a three-phase supply, first and second magnetic amplifiers, gate windings on said magnetic amplifiers connected in series, a load circuit giving a power failure interpretation, means energizing said load circuit through said gate windings, a bias winding on said first magnetic amplifier, a substantially constant voltage source energizing said bias winding, a control winding on said first magnetic amplifier, means energizing said control winding with a voltage which is a function of the voltage of said supply, the magnetomotive forces induced by said bias and control windings being in opposition, with the control winding producing saturation of the cores on said first magnetic amplifier to render its gate windings conducting only while the source voltage is above a predetermined value, a pair of control windings on said second magnetic amplifier, a phase sequence detecting circuit feeding said pair of control windings with voltages producing opposed magnetomotive forces one of which tends to saturate and the other to unsaturate the cores of said second magnetic amplifier, said phase sequence detecting circuit operating to reverse the relative magnitude of the voltages applied to the control windings on said second magnetic amplifier when the phase sequence of the supply reverses, said phase sequence detecting circuit including two substantially equal resistors and a capacitor connected in Y across the three-phase supply with the voltages across said resistance legs of the Y controlling the voltages applied to the control windings on said second magnetic amplifier.

12. In a power failure sensor for detecting under voltage and phase sequence reversal in a three-phase supply, first and second magnetic amplifiers, gate windings on said magnetic amplifiers connected in series, a load circuit giving a power failure interpretation, means energizing said load circuit through said gate windings, a bias winding on said first magnetic amplifier, a substantially constant voltage source energizing said bias winding, a control winding on said first magnetic amplifier, means energizing said control winding with a voltage which is a function of the voltage of said supply, the magnetomotive forces induced by said bias and control windings being in opposition, with the control winding producing saturation of the cores on said first magnetic amplifier to render its gate windings conducting only while the source voltage is above a predetermined value, a pair of control windings on said second magnetic amplifier, a first rectifier bridge feeding one of said pair of control windings, a second rectifier feeding the other of said pair of control windings, a phase sequence sensing circuit comprising two resistors and a capacitor connected in Y across the three-phase supply, said first rectifier bridge being connected in one resistor leg of the Y and the second rectifier bridge being connected in the other resistor leg of the Y, the characteristics of said Y circuit causing the voltages across said bridges to reverse in relative magnitude upon phase sequence reversal of the supply to change the conducting condition of said second magnetic amplifier.

13. In a power failure sensor for detecting low voltage and phase sequence reversal in a three-phase supply, first and second magnetic amplifiers, gate windings on said magnetic amplifiers connected in series, a load circuit giving a power failure interpretation, means energizing said load circuit through said gate windings and rectifiers connected in series therewith providing self-saturating operation of the magnetic amplifiers, a bias winding on said first magnetic amplifier, a substantially constant voltage source energizing said bias winding, a control winding on said first magnetic amplifier, means energizing said control winding with a voltage which is a function of the voltage of said supply, the magnetomotive forces induced by said bias and control windings being in opposition, with the control winding producing saturation of the cores on said first magnetic amplifier to render its gate windings conducting only while the source voltage is above a predetermined value, a pair of control windings on said second magnetic amplifier, and a phase sequence detecting circuit feeding said pair of control windings with voltages producing opposed magnetomotive forces one of which tends to saturate and the other to unsaturate the cores of said second magnetic amplifier, said phase sequence detecting circuit operating to reverse the relative magnitude of the voltages applied to the control windings on said second magnetic amplifier when the phase sequence of the supply reverses.

14. In a power failure sensor for detecting low voltage and phase sequence reversal in a three-phase supply, first and second magnetic amplifiers, gate windings on said magnetic amplifiers connected in series, a load circuit giving a power failure interpretation, means energizing said load circuit through said gate windings, a control winding on said first magnetic amplifier, means energizing said control winding with a voltage which is a function of the voltage of said supply and through a Zener diode in its breakdown direction of conduction, a bias winding on said first magnetic amplifier, means connecting said bias winding across said Zener diode to provide a substantially constant voltage source for said bias winding, the magnetomotive forces induced by said bias and control windings being in opposition, with the control winding producing saturation of the cores on said first magnetic amplifier to render its gate windings conducting only while the source voltage is above a predetermined value, a pair of control windings on said second magnetic amplifier, and a phase sequence detecting circuit feeding said pair of control windings with voltages producing opposed magnetomotive forces one of which tends to saturate and the other to unsaturate the cores of said second magnetic amplifier, said phase sequence detecting circuit operating to reverse the relative magnitude of the voltages applied to the control windings on said second magnetic amplifier when the phase sequence of the supply reverses.

15. In a power failure sensor for detecting under voltage and phase sequence reversal in a three-phase supply, first and second magnetic amplifiers, gate windings on said magnetic amplifiers connected in series, a load circuit giving a power failure interpretation, means energizing said load circuit through said gate windings, a feedback winding on said first magnetic amplifier energized from the output of the gate windings of the magnetic amplifiers to provide a positive feedback to said first magnetic amplifier for bi-stable operation thereof, a bias winding on said first magnetic amplifier, a substantially constant voltage source energizing said bias winding, a control winding on said first magnetic amplifier, means energizing said control winding with a voltage which is a function of voltage of said supply, the magnetomotive forces induced by said feedback and control windings being in opposition to that induced by the bias winding, the control winding producing saturation of the cores on said first magnetic amplifier to render its gate winding conducting only while the source voltage is above a predetermined value, a pair of control windings on said second magnetic amplifier, and a phase sequence detecting circuit feeding said pair of control windings with voltages producing opposed magnetomotive forces one of which tends to saturate and the other to unsaturate the cores of said second magnetic amplifier, said phase sequence detecting circuit operating to reverse the relative magnitude of the voltages applied to the control windings on said second magnetic amplifier when the phase sequence of the supply reverses.

References Cited in the file of this patent

UNITED STATES PATENTS

| | | |
|---|---|---|
| 1,657,303 | Evans | Jan. 24, 1928 |
| 2,594,022 | Horton | Apr. 22, 1952 |
| 2,714,702 | Shockley | Aug. 2, 1955 |
| 2,858,457 | Epstein | Oct. 28, 1958 |
| 2,895,085 | Seidband | July 14, 1959 |
| 2,914,703 | Clark | Nov. 24, 1959 |

FOREIGN PATENTS

| | | |
|---|---|---|
| 1,059,855 | France | Mar. 29, 1954 |